United States Patent Office 2,894,916
Patented July 14, 1959

2,894,916
POLYMERS OF HYDROCYANIC ACID

James C. Burleson, Texas City, Tex., assignor to Monsanto Chemical Company, St. Louis, Mo., a corporation of Delaware No Drawing. Application October 25, 1955
Serial No. 542,779

3 Claims. (Cl. 260—2)

This invention relates to novel polymeric compositions and, more particularly, to hydrolyzed polymers of hydrocyanic acid. The invention also relates to the use of such hydrolyzed polymers of hydrocyanic acid as dispersing or deflocculating agents in aqueous dispersions or suspensions of finely divided solid materials such as pigments, clays, and the like.

It has been known for some time that hydrocyanic acid will polymerize to yield various types of polymeric products, depending upon the particular conditions employed. In the earliest art it had frequently been observed that upon standing, especially when exposed to the action of light, an aqueous solution of hydrocyanic acid yielded a brown precipitate generally referred to as "azulmic compounds" or sometimes termed azulmic acid. U.S. Patent 1,464,802, issued to Bohart August 14, 1923, describes the production of a brownish-black amorphous precipitate from aqueous solutions of hydrocyanic acid. Another method for the preparation of hydrocyanic acid polymers has been disclosed by Adams et al. in U.S. Patent 2,069,543, who also claim "a soft, dull black, apparently amorphous polymerized product of hydrocyanic acid." While these polymers have been recognized and prepared, they have found such limited utility that they have achieved little commercial significance. The earliest products were, of course, no more than chemical curiosities. The polymer made by Bohart was an insoluble material which he treated to make soluble for use as a dye stuff in producing various shades of yellow and brown. Adams et al. describe their products as being "particularly useful as activators in chemical reactions, particularly as activators in the metal-treating industry." This is the extent to which polymers of hydrocyanic acid have up to now been demonstrated to be useful.

It has now been discovered that significantly improved aqueous dispersions of finely divided solid materials can be prepared by incorporating therein a minor amount of novel hydrolyzed polymers of hydrocyanic acid preferably in the form of their salts. These hydrolyzed HCN polymers have proved to be particularly useful in the preparation of aqueous dispersions of pigments and in the preparation of aqueous dispersions of clays to be used as drilling muds.

It is an object of this invention, therefore, to provide a new class of polymers of hydrocyanic acid.

It is also an object of the invention to provide a new class of polymers of hydrocyanic acid characterized by a high degree of surface activity and to provide as well a process by which such polymers can be produced on a commercial scale.

It is another object of this invention to provide improved aqueous dispersions of finely divided solid materials.

It is still another object of the invention to provide novel compositions of matter comprising hydrolyzed polymers of hydrocyanic acid incorporated in aqueous dispersions or suspensions of finely divided solid materials such as clays, pigments, soot, and the like.

It is a specific object of this invention to provide improved aqueous dispersions of finely divided pigments.

Another specific object of this invention is to provide improved aqueous dispersions or suspensions of clays having particular utility in drilling muds.

It is still another object of this invention to provide a method of controlling the viscosity of aqueous drilling muds without adversely affecting other properties such as gel strength and filtration rate.

A still further object of the invention is to provide an aqueous drilling fluid having controlled viscosity.

Further objects and advantages will become apparent from the following description of the invention.

According to the invention, the novel hydrocyanic acid polymers are prepared by polymerizing liquid hydrocyanic acid in the presence of an alkaline catalyst and thereafter hydrolyzing and/or saponifying the polymer by treatment with water in the presence of an acid or an alkali. In accordance with the invention also, the dispersion of a finely divided solid such as a clay, pigment or the like suspended in an aqueous medium may be readily effected by incorporating in said suspension a small quantity of a hydrolyzed polymer of HCN. Consequently, in addition to the hydrolyzed HCN polymers per se, the invention is also considered as encompassing compositions of matter which are mixtures comprising finely divided solid materials such as various clays, pigments, etc., suspended in an aqueous vehicle and a sufficient amount of a hydrolyzed polymer of HCN to maintain the viscosity of the mixtures at the desired level.

While the structure of the polymer $(HCN)_n$ has not been definitely established, several possible structures have been postulated. Of these, the more likely, based upon the observed activity of the hydrolyzed materials, appears to be either (1)
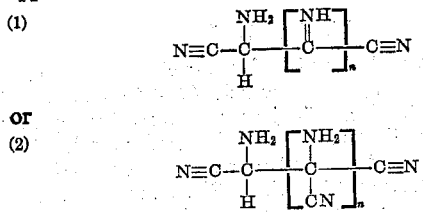

or (2)
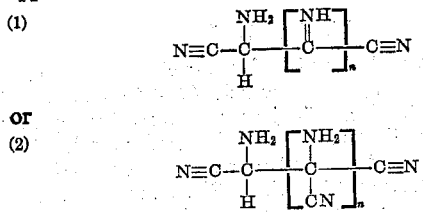

Upon hydrolysis the polymer in (1) would then have the structure corresponding to (3)
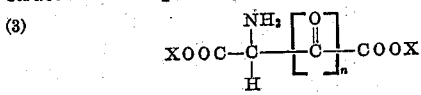

and that in (2) would be either (4)
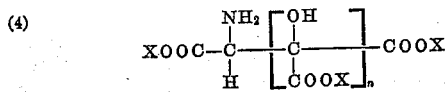

or (5)
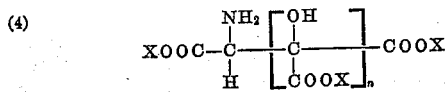

wherein X may be hydrogen or a salt-forming cation preferably selected from the group consisting of the alkali metals and ammonium. Actually, the hydrolyzed polymer of the invention is probably a mixture in varying proportions of materials represented by the structures in (4) and (5) above with that represented by (5) predominating.

The following examples of a practical method of preparing the novel polymeric materials of the invention

EXAMPLE I

Approximately 350 g. of liquid hydrocyanic acid (99+% HCN) and 3.5 g. of triethyl amine were charged to a 1-liter, three-necked, round-bottomed reaction flask equipped with a stirrer, a thermometer and a condenser cooled by circulating cold water (0° C.). The mixture was stirred for 72 hours at 25° C. Excess hydrocyanic acid was then vented and the solid product was ground in a ball mill for 2 hours. The amount of polymer, a dark brown solid material, recovered was 252 g., representing a once-through yield based on HCN of 72%.

A 50-g. sample of the polymer was charged with 37.8 g. of sodium hydroxide (C.P.) and 150 ml. of water to a three-necked, two-liter flask fitted with a reflux condenser serviced with tap water at 25° C., a stirrer, and a thermometer. Quantities employed were based on the assumption that one-half of the nitrogen in the polymer was available for hydrolysis and hence approximately 0.925 mol of polymer and 0.923 mol of NaOH were present in the charge. This assumption actually had good basis in fact. The results of experiments with polymer of known nitrogen content (as determined by analysis) which was hydrolyzed with varying quantities of caustic and then analyzed for sodium and residual nitrogen content verified that the 50% figure is fairly accurate. Theoretical nitrogen content of the completely hydrolyzed material should be about 14% on this basis. The mixture was refluxed for ten hours at a temperature of approximately 100° C., during which time ammonia was evolved. It was then dried overnight at 135° C. and 760 mm. Hg and ground in a ball mill. The amount of hydrolyzed polymer recovered was 84.3 g. Based on the polymer charged and the assumed possible theoretical yield of 86.0 g., this represents a yield of 98%. Kjeldahl analysis of the hydrolyzed polymer showed a nitrogen content of 14.2%. The hydrolyzed polymer was soluble in water so a 10% aqueous solution was prepared for evaluation.

EXAMPLE II

Into a 16-oz. wide-mouthed jar was charged 210 g. of commercial liquid hydrocyanic acid (99+% HCN) and 2.1 g. of triethylamine. The jar was covered loosely with a lid and a one-liter beaker was inverted over it. The mixture was allowed to stand thus overnight (16–18 hr.) at room temperature (25° C.). Since the polymerization reaction is an exothermic one, the temperature of the reaction mixture became somewhat elevated but no attempt was made to record the maximum temperature during the reaction. At the end of the reaction period all the unreacted HCN had volatilized and the dry polymer was removed and ground in a ball mill for two hours. The dark brown solid polymer recovered weighed 81 g., representing a once-through molal yield of 38.6% based on HCN.

Two pounds of the polymer were then prepared in this fashion and two samples of the polymeric material were hydrolyzed by the same procedure as given in Example I to yield the sodium salt. The table below summarizes these runs.

| Polymer (g.) | Water (ml.) | NaOH (g.) | Hydrolyzed Polymer (g.) | $N_2$ Content, Percent | Yield |
|---|---|---|---|---|---|
| 150 | 500 | 113.5 | 248 | 14.04 | [1] 96.3 |
| 150 | 500 | 56.7 | 191.4 | 21.72 | [2] 94.0 |

[1] Percent of theoretical yield based on estimate that 50% of the nitrogen in the polymer is available for hydrolysis.
[2] Percent of theoretical yield based on estimate that 25% of the nitrogen in the polymer is available for hydrolysis.

While specific reactants, quantities of reactants, and reaction conditions have been set forth in the preceding examples, the process for the preparation of the novel compounds of the invention is subject to substantial variations. For example, although the liquid hydrocyanic acid should preferably be of the highest order of purity and anhydrous, acid of concentrations down to 95%, where the major contaminant is water, may be employed.

Although triethyl amine is definitely the preferred catalyst, other aliphatic and aromatic amines, either primary, secondary or tertiary, which will dissolve in liquid HCN, may be employed. Particular ones which are suitable include, for example, methyl amine, trimethyl amine, ethyl amine, tri-n-butyl amine, n-propyl amine, aniline, toluidine, benzylamine, the naphthylamines, hydrazine, and the like. Other satisfactory catalysts include compounds which are alkaline in reaction when dissolved in liquid HCN such as the alkali metal hydroxides, potassium and sodium hydroxide, for example, sodium and potassium carbonates, and ammonium hydroxide or ammonia.

The amount of catalyst employed may also be varied within rather wide limits. Amounts ranging from as little as 0.1% up to 10% by weight of the HCN charge are satisfactory. However, with very small percentages of catalyst the time required for completion of the reaction is considerably extended. Preferred catalyst concentrations for reasonable or practical reaction times lie in the range from about 1 to about 5%. The rate of polymerization is linear with catalyst concentration. Usually, doubling the concentration of a given catalyst increases the yield for a given time period by a factor of approximately 2.5. However, it has been demonstrated that the concentration of catalyst employed has no significant effect on the average molecular weight of the hydrolyzed HCN polymer produced.

The polymerization reaction is a liquid-phase one which occurs readily at the boiling point of HCN at approximately atmospheric pressure and the application of external heat is not required. Best results are obtained at a temperature of approximately 20–30° C. and preferably at about 25° C. in an "open" system, that is, the reaction vessel is open to the atmosphere through a reflux condenser through which a cooling medium such as water, for example, maintained at 0 to 10° C. is circulated. With this method, development of pressure in the system arising from the exothermic character of the reaction is avoided. Polymerization may be conducted in a closed system under pressure, but the nature of the polymer produced may be somewhat different if conditions are too drastically different from those outlined above.

The rate of reaction and hence the reaction time is somewhat dependent upon the catalyst concentration. Generally with the preferred quantity of 1 to 5% of catalyst by weight of the HCN charge, satisfactory yields are obtained in reaction periods of from about 8 to about 10 hours. Longer times up to 16 to 18 hours generally will give improved yields. The rate of polymerization at atmospheric pressure is linear with time and a two-fold increase in reaction time will result in a yield increased by a factor of 2.5. In a practical process, therefore, a balance between yield and reaction time must be struck based on the economic considerations deemed important. Unreacted HCN can, of course, be recovered, as can the unused catalyst. It has been found that the nature of the polymer is not affected to any particular extent by the time required for polymerization. Polymers produced over a 70-hour reaction period that have been subsequently hydrolyzed have been found to have substantially the same molecular weight as those made in 17.5 hours under the same conditions of temperature, pressure, and catalyst concentration.

Upon completion of the reaction, the polymeric products formed are readily recovered by allowing excess HCN, if any is present, to evaporate and then subjecting the solid material to drying by external heating.

Conditions under which hydrolysis is effected may likewise be varied to some extent depending upon the product desired, i.e., whether the desired form of the hydrolyzed polymer is the free acid or the salt. Hydrolysis is preferably carried out in the presence of a base such as the alkali metal hydroxides and ammonium hydroxide. However, acid hydrolysis may be employed in which case suitable acids are mineral acids such as sulfuric acid and hydrochloric acid.

Generally, for complete hydrolysis of all the nitrogen which is available in the polymer for conversion to carboxyl groups, at least two molecular parts of water and one molecular part of base are employed per part of polymer. For practical purposes and in cases where as complete hydrolysis as possible is desired so that the nitrogen content of the hydrolyzed polymer is kept at a minimum, water is usually employed in excess. The extent of hydrolysis may, of course, also be controlled by regulating the amount of base employed. If less than complete hydrolysis is desired, then proportionately smaller quantities of base are employed.

The hydrolyzing reaction occurs to a minor extent at temperatures as low as 25° C. and thus this step may be carried out at any temperature within the broad range from about 25° C. to about 200° C. Optimum results are achieved usually at temperatures in the range from about 100° C. to about 160° C. at atmospheric pressure or in suitable equipment at the higher temperatures under autogenous pressure. When operating within the preferred temperature range, a reaction time of about 6 to about 12 hours is satisfactory, while a time from about 9 to about 10 hours is preferred. Extended periods of time in excess of those mentioned, other conditions being constant, result in little variation in residual nitrogen in the finished product.

The product resulting from hydrolysis is usually an aqueous solution which may be used as such or from which the solid hydrolyzed polymer may be recovered by evaporative drying, for example.

These novel hydrolyzed polymers of hydrocyanic acid have unusual characteristics or properties which make them of outstanding value as dispersing agents in the preparation of dispersions or suspensions of finely divided solid materials in an aqueous medium. In the manufacture of paints, for example, practically all pigments employed, particularly inorganic pigments, are prepared or processed in aqueous media and are initially recovered as a pulp or paste. In the preparation of aqueous pigment pulps themselves as well as in the dry grinding of pigments intended for water dispersions, surface active agents are often used to improve the degree of dispersion. The degree of dispersion of the pigment has a strong influence on the rheological properties of the paint as well as upon its covering power. Materials used in the prior art for dispersing pigments have been many and varied and have included, for example, naphthalene sulfonates, proteins, lignin sulfonates, fatty alkyl sulfates and quaternary ammonium compounds. It has now been determined that hydrolyzed polymers of HCN are particularly effective dispersing agents for pigments. The hydrolyzed polymers of HCN are characterized as products which by their presence act to prevent flocculation or agglomeration of solid particles of pigment suspended in water. In contrast to the compounds so employed in the prior art, smaller amounts of the hydrolyzed polymer of HCN are required to promote a comparable degree of dispersion in pigments. With most dispersants, further addition after maximum thinning has been attained is characterized by an immediate increase in viscosity. This is not the case, however, with the thinners of the present invention since maximum thinning is maintained over a wider range of dispersant concentration and the likelihood of overtreatment is, therefore, minimized. The latter are also more desirable than those of the prior art for the reason that they maintain a constant low level of viscosity over a much wider solids concentration range. They thus have the advantage of permitting the preparation of suspensions of much higher solids concentration per given quantity of dispersing agent.

The dispersing agents of the invention are effective generally with all pigments. Of the many in existence which can be dispersed in aqueous medium using the thinning agents described herein are ferric oxide, iron blues, red lead, white lead (basic carbonate), white lead (basic sulfate), lead chromate, zinc oxide, zinc chromate, zinc sulfide, lithopone, chromium oxide, titanium dioxide (anatase), titanium dioxide (rutile), antimony oxide, cadmium sulfide, lead titanate, and the like. They are also useful with extended pigments such as titanium-barium, titanium-calcium, and zinc sulfide-magnesium pigments or with any combinations of pigments used to provide pigments of other than the primary colors such as lead chromate-lead oxide for making lighter shades of chrome orange, and iron blue and lead chromate for making chrome greens.

The quantity of dispersing agent to be used depends, of course, on the degree of dispersion desired, or, in other words, the consistency or fluidity desired, the particle size of the dispersate, and the concentration of the dispersion. In general, from 0.05% to 5% by weight of the dispersing agents of the invention based on the dispersate will give good results. This applies to all types of dispersates, whether or not they be pigments. The hydrolyzed polymers of HCN may be added to the pigment suspension as an aqueous solution or as a solid in powdered form or it may be incorporated as a dry solid with the dry pigment in the grinding or milling operation. Alternatively, the dispersion and mixing may take place simultaneously by intimately mixing the pigment with water and the dispersing agent.

The effectiveness of the HCN polymers of the invention as dispersing agents for pigments is illustrated in the following examples. Viscosimetric measurements have been employed for evaluating dispersing action. The viscosity of the system is measured and the fluidity of the sample is taken as an indication of the relative degree of dispersion based on the commonly accepted conception that for the same concentration of solids under similar conditions, the more fluid is the sample, the more completely dispersed are the suspended particles. A Baroid modification of a Stormer viscosimeter was employed in obtaining the data given here.

EXAMPLE III

A 50% suspension of pigment-grade titanium dioxide ("Titanox"—Titanium Pigment Co.) in water was prepared by stirring 100 g. of the pigment in 100 g. of water at high speed for five minutes in a Waring Blendor. The viscosity of the suspension was measured. Small increments of a 10% aqueous solution of the sodium salt form of the hydrolyzed HCN polymer as prepared in Example I having a specific gravity of 1.065 were then added to the suspension with a one-minute stirring period after each addition. Viscosity measurements were made after each addition of the dispersing agent. The data tabulated below illustrate the remarkable effectiveness of the hydrolyzed hydrocyanic acid polymer as a dispersing agent.

| Conc. of Hydrolyzed HCN Polymer Added (Wt. Percent of Pigment) | Viscosity, cp. |
|---|---|
| 0.0 | [1] Plastic |
| 0.1 | Plastic |
| 0.2 | 65 |
| 0.3 | 13 |
| 0.4 | 9 |
| 0.5 | 7 |
| 0.6 | 13 |
| 0.8 | 21 |

[1] Too thick to measure.

EXAMPLE IV

A suspension of 54.1 g. of zinc oxide pigment in 54 g. of water was prepared by stirring the two together to give a thick patse having so-called "plastic" viscosity. Enough of a 10% aqueous solution of the sodium salt form of the hydrolyzed polymer of HCN was added to the suspension to represent a concentration of 0.39% by weight of the pigment and the mixture was then stirred thoroughly. The viscosity of the suspension was almost immediately reduced to about 10 centipoises so that the treated suspension flowed freely upon pouring.

EXAMPLE V

The test in Example IV was repeated using a suspension of 100 g. of kaolin clay in 100 g. of water and enough of the HCN polymer to represent a concentration of 0.53% by weight of the pigment. Again the thick paste which originally had no fluid properties at all was converted into a free flowing liquid with a viscosity of approximately 5 centipoises by the addition of the polymer.

In another specfic embodiment of this invention, hydrolyzed polymers of HCN are used to prepare drilling muds having exceptional properties.

Drilling of an oil or gas well by the rotary method is performed by rotating a bit attached to the end of a hollow drill pipe, known as a drill stem, which extends downward through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then upward through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drilling hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption.

The properties of the drilling mud are changed during drilling because some of the strata traversed are composed of shales, clays, etc., which become dispersed in the fluid and produce a gradual increase in the viscosity of the drilling mud with continued use. Contamination by salt brines or as a result of cementing operations likewise causes undesirable increases in viscosity. The custom of using weighting materials, such as barytes or hematite, to increase the density of the mud also results in increased viscosity. If the viscosity is allowed to become too great, difficulties are encountered both in pumping the mud and in removing cuttings from the mud at the surface. Another serious problem with highly viscous fluids is that of "gas cutting." The gas from the formation or formations through which the well passes becomes entrained in the drilling fluid since it cannot readily escape in the surface pits and the fluid which is recirculated consequently has a lighter weight than is desired. This greatly lessens its effectiveness in holding back formation pressures and significantly increases the possibilities of a blowout. For these reasons, it is obvious that the consistency of the drilling mud must be carefully controlled.

In practice, reduction in viscosity may be achieved by dilution with water or by the addition of dispersants. The former method, while it may be satisfactory in specific instances, has many drawbacks and disadvantages and so the practice of adding various chemicals to drilling fluids to reduce viscosity has become more or less standard. A large number of chemicals such as pyrophosphates, polyphosphates, tannates, humates, and phytates have been employed in the prior art. In many cases, however, the extent to which a drilling fluid can be controlled by such chemicals is limited.

In accordance with the invention, the viscosity of an aqueous drilling fluid may be controlled efficiently by incorporating therein a sufficient amount of hydrolyzed polymers of HCN. The drilling mud composition of the invention may be described briefly as a mixture comprising finely divided solid material, an aqueous vehicle in which the solid material is dispersed or suspended, and a sufficient amount of hydrolyzed polymers of HCN to maintain the viscosity of the fluid at the desired level. The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clayey subsurface formations are drilled. Weighting material added to increase specific gravity such as barytes, iron oxide, calcium carbonate, silica and the like may also be included.

The aqueous medium may be fresh water such as is obtained from wells or streams; it may be salt water from the sea or from wells; it may even include oil-in-water emulsions, i.e., water which has become contaminated in some way with small quantities of oil, or to which such oil has been added to gain some desired advantage.

It is contemplated that the drilling muds of the invention may also contain other additives besides the hydrolyzed polymers of HCN of the invention. Materials such as caustic, quebracho, lime, cement, gypsum and the like may be added to the drilling mud at the surface or may be encountered in subsurface formations during drilling operations.

The quantities of the hydrolyzed polymers of HCN to be employed in the drilling mud of the invention will vary with circumstances over a reasonably wide range and the amount employed in a specific suspension or dispersion will depend on these circumstances and the characteristics of the material treated. Ordinarily, satisfactory results will be obtained with quantities ranging from 1 to 4 pounds of the hydrolyzed polymer of HCN per 42-gallon barrel of drilling mud. On the other hand, in some cases where only small improvement in viscosity is desired, as little as 0.5 lb. of the additive per barrel of mud will produce the desired effect. Above 4 lb. per barrel, the small increase in effect in most cases would not warrant the additional cost of the material. The use of larger amounts of the hydrolyzed polymers of HCN, say in quantities up to 6 lb. per barrel, would not usually have any harmful effect on the mud. Excessive quantities however, might lead to over-treatment, i.e., develop an increase in viscosity. The exact amount to be added depends, as previously pointed out, upon the particular mud and on the properties desired. This can be determined, as is the customary procedure for all additives, by simple routine tests at the time the addition is made.

The following examples are presented to illustrate the effectiveness of the hydrolyzed HCN polymers as viscosity control agents in drilling muds.

EXAMPLE VI

A synthetic drilling mud was prepared containing 35% solids suspended in water. On a dry basis the solids consisted of 10 parts by weight of Tennessee ball clay, 1 part by weight of bentonite and 4 parts by weight of Dixie Bond clay. Mud samples were made up containing varying quantities of two different samples of hydrolyzed HCN polymers (designated as Polymer No. 1 and Polymer No. 2 in this and the following example) in the form of their sodium salts. Polymer No. 1 was the same material used in Examples III, IV, and V and had a nitrogen content of 14.04%, while Polymer No. 2 was from another batch and contained 21% nitrogen. The samples were then tested by means of standard procedures to evaluate the HCN polymer as a thinner. The procedure used was that given in "Recommended Practice for Standard Field Procedure for Testing Drilling Fluids" of the American Petroleum Institute, third edition, May 1950, except as otherwise indicated for viscosity determinations. The flow behavior of the mud was determined with a multispeed Fann V–G viscosimeter. A description of this instrument, the plastic flow properties it measures and their significance in drilling mud control may be found in Melrose and Lilienthal, J. Pet. Tech., T.P. 3061, p. 159 (1951). In general, field control of mud viscosity properties is directed toward the maintenance of a constant and preferably a low resistance to flow. The measurement of this resistance to flow with the Fann viscosimeter is the yield value which is actually a measurement of the interparticle forces in the mud. Chemical treatment of the mud directly affects the yield value, hence the effectiveness of a particular chemical additive as a thinner or in reducing resistance to flow is directly measurable by means of the yield value. Results of the tests are presented in Table I. These data demonstrate that the addition of the novel polymeric compositions of the invention in quantities of from 0.5 lb. per barrel and upwards produces a drastic reduction in viscosity of the mud without adversely affecting its thixotropic properties or its filtration rate characteristics.

Table I

| Additive | Amt. of Additive (lb./bbl.) | pH | Viscosity | | | Gel Strength | | Filtration Rate, cc. in 30-Min. API |
|---|---|---|---|---|---|---|---|---|
| | | | 600 r.p.m. Fann (cp.) | Plastic (cp.) | Yield Point (lb./100 ft.²) | 0-Min. (g.) | 10-Min. (g.) | |
| Blank | 0 | 5.8 | 77 | 15 | 124 | 170 | 170 | 22 |
| Polymer No. 1 | 0.5 | 7.2 | 10 | 7 | 6 | 5 | 30 | 14.5 |
| Do | 1.0 | 8.0 | 10.5 | 7 | 7 | | | |
| Do | 1.5 | 8.5 | 12.5 | 8 | 9 | | | |
| Do | 2.0 | 8.9 | 14 | 9 | 10 | | | |
| Do | 3.0 | 9.3 | 16.5 | 10 | 13 | | | |
| Do | 4.0 | 9.5 | 16.5 | 10 | 13 | | | |
| Do | 5.0 | 9.6 | 16.5 | 10 | 13 | 30 | 130 | 11.5 |
| Blank | 0 | 5.8 | 85 | 12 | 146 | 170 | 170 | 22 |
| Polymer No. 2 | 0.5 | 7.0 | 11.5 | 8 | 7 | 15 | 40 | |
| Do | 1.0 | 7.3 | 10 | 7 | 6 | 2 | 25 | 15.5 |
| Do | 1.5 | 7.6 | 10 | 8 | 4 | | | |
| Do | 2.0 | 7.8 | 10 | 8 | 4 | | | |
| Do | 3.0 | 8.2 | 11 | 7 | 8 | | | |
| Do | 4.0 | 8.4 | 12.5 | 9 | 7 | | | |
| Do | 5.0 | 8.6 | 13.5 | 9 | 9 | 10 | 40 | 12 |

EXAMPLE VII

Frequently, viscosity control agents which are satisfactory for use in muds made with fresh water are not useful when salt water is used for making the mud. A series of tests were run in sea-water mud, therefore, to evaluate the HCN polymers tested in Example V in the presence of dissolved salt. The mud stock employed was the same as that of Example V except that salt water obtained from the Gulf of Mexico was used instead of fresh or distilled water. Results of these tests, presented in Table II below, demonstrate that the polymers of the invention are also effective in this particular mud.

Table II

| Additive | Amt. of Additive (lb./bbl.) | pH | Viscosity | | | Gel Strength | | Filtration Rate, cc. in 30-Min. API |
|---|---|---|---|---|---|---|---|---|
| | | | 600 r.p.m. Fann (cp.) | Plastic (cp.) | Yield Point (lb./100 ft.²) | 0-Min. (g.) | 10-Min. (g.) | |
| Blank | 0.0 | 12.4 | Plastic | Plastic | Plastic | Plastic | Plastic | 60 |
| Polymer No. 1 | 1.0 | 11.9 | 71 | 14 | 114 | | | |
| Do | 2.0 | 11.9 | 31 | 8 | 46 | | | |
| Do | 3.0 | 12.0 | 20 | 8 | 24 | | | |
| Do | 4.0 | 12.0 | 15.5 | 8 | 15 | | | |
| Do | 5.0 | 12.0 | 13 | 7 | 12 | 20 | 30 | 41 |
| Polymer No. 2 | 1.0 | 12.2 | 93.5 | 12 | 163 | | | |
| Do | 1.5 | 12.2 | 50 | 10 | 80 | | | |
| Do | 2.0 | 12.2 | 34 | 10 | 48 | | | |
| Do | 3.0 | 12.2 | 19.5 | 8 | 23 | | | |
| Do | 4.0 | 12.2 | 15 | 7 | 16 | | | |
| Do | 5.0 | 12.2 | 12 | 6 | 12 | 30 | 40 | 46 |

The remarkable versatility of the HCN polymer as a dispersing agent is well illustrated in Example VIII, since it is well known that many dispersants useful in pigment and clay systems, for example, are entirely unsatisfactory in soot slurries which are frequently uncommonly difficult to deflocculate.

EXAMPLE VIII

The effectiveness of the hydrolyzed HCN polymer for dispersing soot was determined by treating a sample of a soot slurry containing 13.9% soot in water as described in Example III with small increments of a 10% aqueous solution of the polymeric composition. Data obtained are recorded below:

| Conc. of Hydrolyzed HCN Polymer Added (Wt. Percent of Dry Soot) | Viscosity, cp. |
|---|---|
| 0.0 | Plastic |
| 0.75 | ~65 |
| 0.95 | 51 |
| 1.15 | 38 |
| 1.35 | 31 |
| 1.55 | 23 |
| 1.7 | 21 |
| 1.9 | 17 |
| 2.1 | 17 |
| 2.3 | 16 |
| 2.7 | 13 |

The preceding examples have illustrated two specific applications of the hydrolyzed HCN polymers as dispersants. Aqueous dispersions of other types of finely divided solid materials can also be prepared using the HCN polymers. Aqueous dispersions of adhesives, and cement for instance, are additional examples of dispersions that can be prepared by incorporating therewith a minor amount of these polymers.

My co-pending application, Serial No. 542,780, filed October 25, 1955, Patent No. 2,855,365, claims the use, as dispersing agents, of the novel hydrolyzed HCN polymers disclosed and claimed herein.

What is claimed is:

1. A hydrolyzed polymer of hydrocyanic acid prepared by refluxing with at least equimolecular amounts of water and an alkali at a temperature in the range from about 100° C. to about 160° C. for a period of at least six hours the product obtained by polymerizing hydrocyanic acid in the presence of an alkaline catalyst.

2. A hydrolyzed polymer of hydrocyanic acid prepared by refluxing with at least equimolecular amounts of water and an alkali chosen from the group consisting of the alkali metal hydroxides and ammonium hydroxide at a temperature in the range from about 100° C. to about 160° C. for a period of at least six hours the product obtained by polymerizing liquid hydrocyanic acid in the presence of an alkaline catalyst.

3. A hydrolyzed polymer of hydrocyanic acid prepared by refluxing with at least equimolecular amounts of water and sodium hydroxide at a temperature in the range from about 100° C. to about 160° C. for a period of at least six hours the product obtained by polymerizing substantially anhydrous liquid hydrocyanic acid in the presence of triethyl amine.

References Cited in the file of this patent

UNITED STATES PATENTS

| 2,069,543 | Adams | Feb. 2, 1937 |

FOREIGN PATENTS

| 456,151 | Great Britain | Nov. 3, 1936 |
| 733,269 | Great Britain | July 6, 1955 |

OTHER REFERENCES

Migrdichian: "The Chemistry of Organic Cyanogen Compounds," The Reinhold Publ. Co., N.Y. (1947), page 350. Copy in Div. 6.